Dec. 27, 1966   O. W. GRAHAM   3,295,058
CAPACITANCE PROBE FOR THE DETECTION OF FLUIDS
CONTAINED IN A STREAM OF CRUDE OIL
Original Filed Aug. 24, 1961   3 Sheets-Sheet 1

INVENTOR.
OLLIE W. GRAHAM
BY Arthur L Wade
ATTORNEY

INVENTOR.
OLLIE W. GRAHAM
BY Arthur R Wade
ATTORNEY

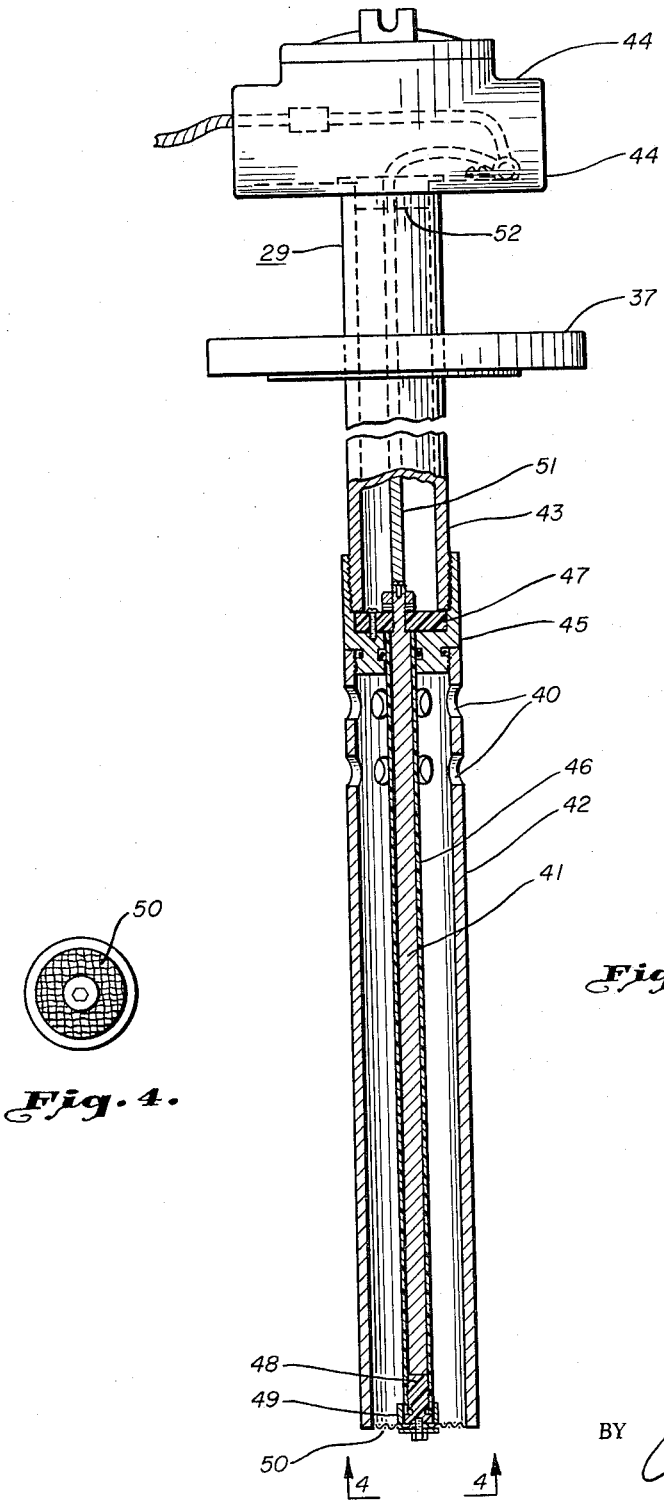

_United States Patent Office_

3,295,058
Patented Dec. 27, 1966

3,295,058
CAPACITANCE PROBE FOR THE DETECTION OF FLUIDS CONTAINED IN A STREAM OF CRUDE OIL
Ollie W. Graham, Tulsa, Okla., assignor to Combustion Engineering Inc., New York, N.Y., a corporation of Delaware
Continuation of application Ser. No. 133,655, Aug. 24, 1961. This application Aug. 31, 1965, Ser. No. 489,781
1 Claim. (Cl. 324—61)

This is a continuation of my application, Serial No. 133,655, filed August 24, 1961, now abandoned.

The present invention relates to detecting the water in oil well production. More particularly, the invention associates a capacitance, as the primary element of an electric circuit, with oil well production in a manner to give accuracy and consistency to the manifestation of the electric circuit.

Production of an oil well often contains varying amounts of water, and an emulsion of oil and water, along with oil. Production can be separated into its water and oil components and the volumes of these components separately measured. However, where two-phase liquid separation equipment is not available, some means responsive to the variable ratio of oil and water is required, as the production is flowed to a gathering system, to determine these different quantities.

A system is needed to continuously manifest, indicate and/or record the amount of oil produced by a particular well under field conditions. The amount of water may be desirably manifested as well, but ultimately an operator must know the net oil of his production for economic operation of his property. A simple, rugged system, suitable for this field operation, is needed to continuously supply this information to an operator.

United States patent, Gunst et al. 2,720,624, which issued October 11, 1955, discloses an electric circuit which actuates an indicator in accordance with changes in the dielectric constant of material to which the primary element of the circuit is exposed. The capacitance element, which functions as the primary element, may be exposed to the material under different conditions. Many factors can vary the dielectric constant to which the element is exposed, apart from the change in the material itself. When the primary element is immersed in oil well production, it is required that the dielectric constant vary only as the ratio of oil to water varies in the production. The effect of gas evolving from the production liquids must be eliminated from the measurement. The effect of ambient temperature variations must be isolated from the capacitance element. No collection of solids, such as paraffin, can be permitted on the element. In summation, the capacitance element should be exposed to the oil well production in an arrangement whereby all factors affecting the dielectric constant, except the change of the oil-water ratio, will be stabilized. Once this stability is obtained, the circuit will manifest the oil, or water, or ratio, of the production, depending upon the calibration of the indicator actuated by the capacitance element.

A principal object of the invention is to reduce the effect of gas evolvement on a capacitance element as a primary element of a circuit manifesting the dielectric constant of oil well production.

Another object is to reduce the effect of ambient temperature variations on the element.

Another object is to maintain the structure of the element free of solids which might tend to adhere and collect on the structure and thereby alter the response of the element to the dielectric constant of the production.

The present invention is embodied in structure including a vessel into which oil well production is produced and wherein gas is evolved from the liquids. The degassed liquids are then provided a flow path contiguous to the structure of a capacitance element. The structure is mounted in the separator vessel where it will be surrounded by a collection of the liquids in the vessel and from which the liquids flow in adjacency to the element. The liquid collection functions as a thermal insulating barrier between variable ambient temperature conditions outside the vessel and the element within the vessel. Further, this arrangement makes it possible for the temperature of liquids flowing in close proximity to the element to be maintained at a level which will obviate deposition of paraffin and other solids from the liquids and onto the structure of the element.

Other objects, advantages and features of this invention will become apparent to one skilled in the art upon consideration of the written specification, appended claim, attached drawings, wherein;

FIG. 3 is a partially sectioned side elevation of the capacitance element of FIG. 2 as removed from the separator, and FIG. 4 is an end view of the element of FIG. 3.

GENERAL PRODUCING SYSTEM

Figure 1:
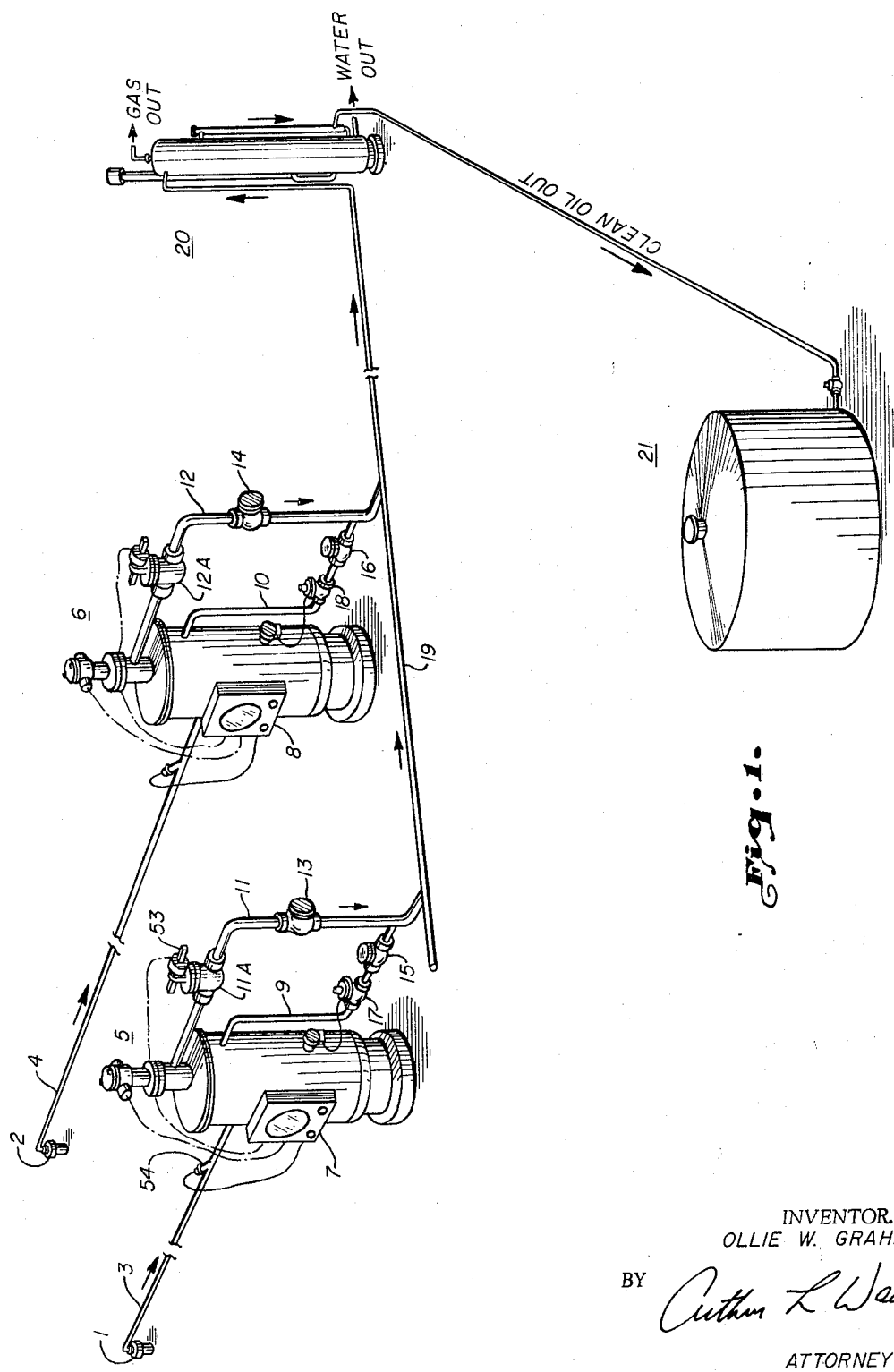
FIG. 1 is somewhat diagrammatic representation of a complete oil well producing system in which the present invention is embodied.

To illustrate an environment for the invention, a portion of the producing and field processing system of a plurality of oil wells is shown in FIG. 1. In this system, the present invention is needed to determine the performance of individual wells. No attempt is made to show all of the apparatus which might be required for producing a particular group of oil wells. However, enough related equipment is illustrated to give meaning to the function of the present invention.

Well heads 1 and 2 are shown as producing into conduits 3 and 4, respectively. Well heads 1 and 2 are merely representative of possible many well heads, grouped for gathering their individual amounts of production to a central point for field processing the combined production. To maintain simplicity of illustration, conduits 3 and 4 are broken as an indication of possibly greater length as well as the inclusion of other producing equipment in the conduits.

The present invention centers about the separator structures 5 and 6, each of which receive all the production from one of the well heads. Within the separators 5 and 6, the production is broken down into its gaseous and liquid phases. The present invention provides an accurate and consistent measurement of the dielectric constant of the liquid phases. The measurement is manifested on metering equipment within housings 7 and 8. This manifestation may then be utilized in connection with the positive displacement meters to obtain the measurement of the amount of oil produced from each well head. After the measurement has been made of the dielectric constant of the liquids, the separated gas is withdrawn from the separator housing, recombined with the liquids and then conducted to downstream processing equipment.

In more specific analysis of the handling of the gas and liquids from separators 5 and 6, conduits 9 and 10 are arranged to remove gas from the separator housings while conduits 11 and 12 remove the liquids. Check valves 13–16 are arranged in these conduits to prevent back flow into the housings.

The degassed liquids are shown as measured quantatively by positive displacement meters. A fluid meter 11A is placed in conduit 11, upstream of check valve 13. Fluid meter 12A is placed in conduit 12, upstream of check valve 14. With these meters, the total water and oil from each separator is determined. With a register coupled to each meter for a period of time proportional to the ratio of the quantity of oil in the mixture to the quantity of water, the register will manifest the quantity of oil passed by the meter. The present invention makes this coupling period an accurate representation of the oil in the liquids by making the capacitance measurement of degassed liquids and at stabilized temperature conditions.

Gas valves 17 and 18 are located in conduits 9 and 10. These valves control the withdrawal of gas from the separators. By control of the gas withdrawal, the internal pressure of the separators is maintained as desired. The internal pressure is desirably maintained, through valves 17 and 18, as needed to force the liquids from the housings and recombine them with the separated gas that the combination might be moved through a single conduit to downstream processing apparatus.

Conduits 9–12 are manifolded into gathering conduit 19. Conduit 19 has also been broken to give recognition to the distance which may be involved in extending to heat treater 20. Further, the break in conduit 19 gives recognition that other equipment may be desired downstream of separators 5 and 6 to process and/or measure the gathered production.

Heat treater 20 is a well-known type of apparatus with which the production is separated into its oil, water and gas phases. Presumably, the clean oil produced by heat treater 20 is ready for sale to a refinery. Tank 21 is provided to receive clean oil product of treater 20.

The pressures at the well heads, in the downstream equipment and at the storage tank, may vary greatly from installation to installation. In this disclosure, it is assumed that sufficient pressure is available to deliver the oil to tank 21. Therefore, no pumps are shown in FIG. 1, although it is evident that pumps could be supplied if needed. In the series of equipment extending from the well heads, the invention embodied in the structure of separators 5 and 6 enable the operator to efficiently and accurately measure the amount of oil produced from each well head.

SEPARATOR-PROBE COMBINATION

Figure 2:
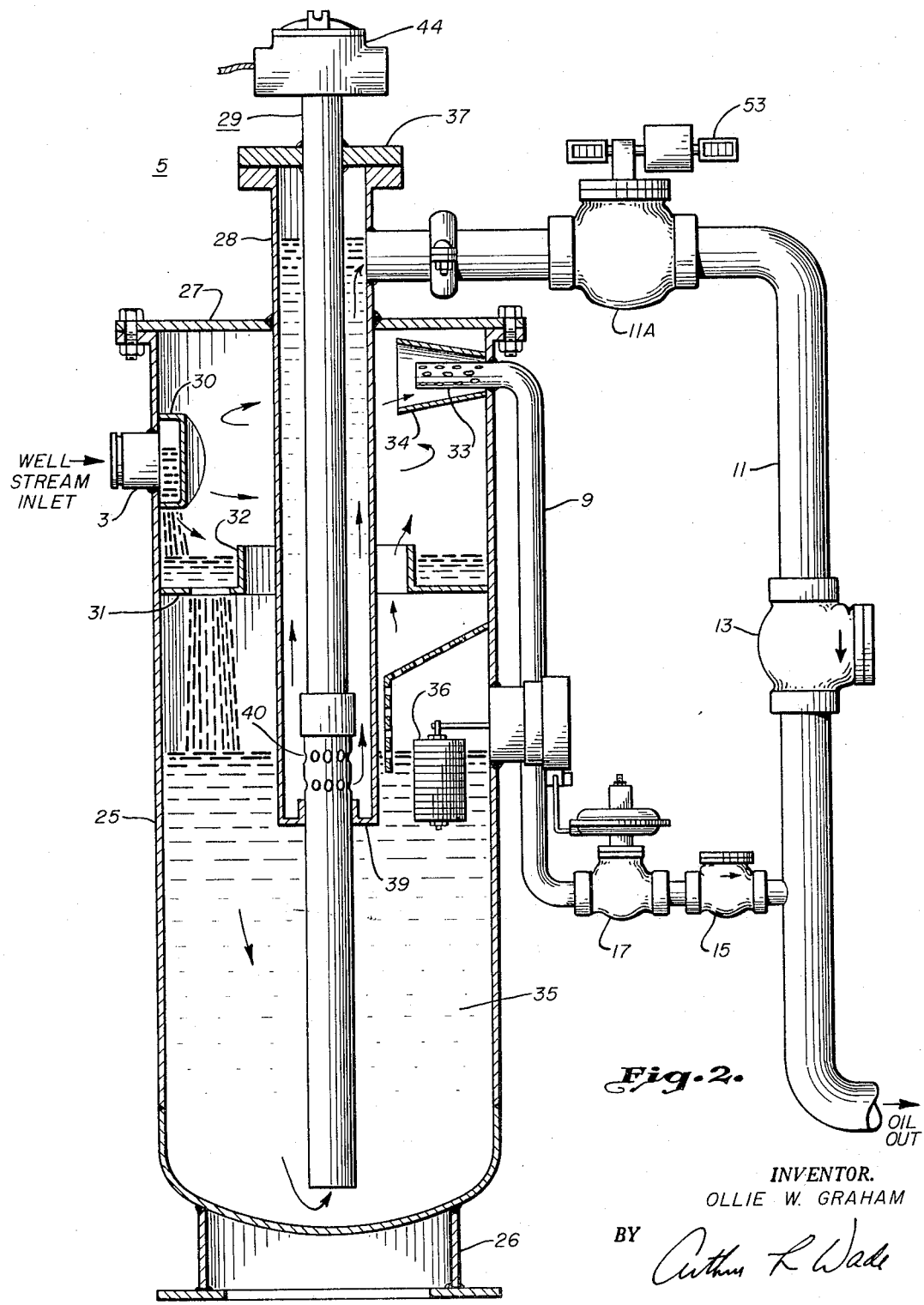
FIG. 2 is a sectioned side elevation of a gas-liquid separator and capacitance element employed in the system of FIG. 1.

FIG. 2 is utilized to consider the internal structure of separators 5 and 6 in greater detail. Specifically, separator 5 has been shown in full sectioned elevation to relate the primary element responsive to the dielectric constant to the well stream liquids. The primary element is, electrically, a capacitor included in an electric circuit which may take the form of that illustrated in United States patent, Gunst et al. 2,720,624, which issued October 11, 1955. The capacitor structure, for convenience, will hereinafter be referred to as a probe. In FIG. 2, the probe is shown mounted within the separator structure 5 in such a way as to carry out the various objectives of the invention.

As a first consideration, the invention teaches how to mount the probe within the separator 5 so as to sense the dielectric constant of well liquids which have been substantially degassed. If the dielectric constant of well liquids is measured while gas is breaking out of the liquids, the manifestation will be erratic and inaccurate. The dielectric constant of gas is different from the dielectric constant of oil and varying mixtures of the two phases will give varying dielectric constants. Therefore, the present invention seeks to bring substantially degassed liquids to the probe for measurement of their dielectric constant in the terms of the amount of oil, or water, in the production.

The next objective of the invention is to utilize the substantially degassed liquids as a barrier between the probe and ambient temperature variations. Properly arranged, the mass of the degassed liquid collection in the bottom of separator 5 will function as a heat sink with respect to temperature variations outside of the separator. The probe immersed in this body of liquids will have its temperature conditions controlled by being immersed, rendering the measurement of the dielectric constant of the liquids consistent and accurate.

Although the body of liquids functions effectively to isolate ambient temperature swings from the probe, the variations of temperature of the incoming well streams presents another problem. It would be possible to heat the incoming well streams to a temperature which would be constant as far as the probe is concerned. However, in some situations, the quantity and temperature of well streams from the well head might make such temperature control very expensive. An alternate is found in sensing the temperature of the stream produced into the separator 5 and compensating the output of the electric circuit with this variable. This arrangement will be discussed in further detail infra.

Finally, the present invention seeks to provide a path for all liquids passing through the separator which will have a consistent relation to the probe. A consistent relationship between the liquid path and probe means, in this disclosure, that the liquids will be caused to flow in a confined conduit which is uniform in physical dimension with respect to the probe.

The separator structure and probe combination disclosed in this application produces at least one basic result. The measurement conditions between the liquids and probe are stabilized so that the manifestation initiated by the probe is a consistent and accurate indication of the dielectric constant of the liquids in terms of the ratio of oil and water in the liquids.

Separator function

The conduit 3 of FIG. 1 is shown in FIG. 2 as bringing the well stream into shell 25. The two phases of this well stream, liquid and gas, are caused to separate. This function of well stream manipulation can be considered apart from the function of the probe as it is mounted within the shell of the separator vessel.

The vessel shell 25 can be seen in FIG. 2 as basically a cylinder with its axis extended in a vertical direction. A dished closure for its lower end is provided and mounted upon a base 26. The top of this cylinder may be closed in various ways. A top plate 27 illustrates a simple means of closure. The plate is bolted to a flange on shell 25. Extending through the center of top plate 27, liquid conduit 28 is mounted coaxial with shell 25. Telescoped within conduit 28, the probe assembly 29 is mounted. A closure plate is welded to the assembly 29 and bolted to a flange on the top of conduit 28.

To release gas from production fluids, the liquids from which the gas is released should be spread as thin as possible for as long a travel as possible to give the bubbles of gas all of the time available to reach the surface of their liquids and break out of the liquids. To initiate this basic function, a diverter structure 30 is provided to direct the well stream upon the upper portion of the internal wall of shell 25 in a circular path. On the walls of shell 25, the elongated travel of the liquids takes the form of a relatively thin film from which the gas readiy releases.

The liquids spread by diverter 30 are given a circular path of more definition about the inside of shell 25 with tray 31 and its central upstanding collar 32. The liquids circulate in the annulus between collar 32 and the walls of shell 25, and fall to the bottom of shell 25 through an opening in tray 31. The degassed liquids falling to the lower end of shell 25 form a body of the liquids. It is in this collection of the degassed well liquids that the probe is immersed, isolated from the ambient temperature changes external the shell 25. Obviously, this specific shape of the separating baffles 30, 31 and 32 could be given variations from that disclosed. However, all such structure would have the common denominator of flowing the well stream in such manner as to enable the gas to break therefrom in a separation process.

The gas, breaking from the well stream liquids ascends to the top of shell 25 and is drawn off through gas conduit 9. The end of conduit 9 extending through the wall of shell 25 is perforated at 33 and surrounded by a cone structure 34. Cone 34 is a shield for the preforated end of conduit 9 in that liquids spread upon the internal walls of shell 25, will be prevented from flowing into the perforations and being drawn off with the gas in conduit 9. The gas circulating around the inside of shell 25 as it is evolved from the liquids must flow away from the liquids to enter the cone 34 and flow out perforations 33.

The liquids which collect in body 35, in the lower end of shell 25, are drawn up through the probe structure and into conduit 28. From conduit 28, the liquids flow through conduit 11 and are recombined with the gas of conduit 9. The gas pressure within shell 25, on the surface of liquid body 35, forces the liquids up through conduit 28 and out conduit 11. The pressure on the surface of liquids 35 is regulated by the position of valve 17 in conduit 9.

To position regulating valve 17, a means is arranged responsive to the level of liquids 35 in separator 25. Specifically, float 36 is carried on the surface of liquids 35 and actuates a mechanism which positions valve 17 in accordance with the height of liquids 35. In general, as the liquid level rises, float 36 actuates its mechanism to cause valve 17 to move toward its closed position. Restricting the discharge of gas through conduit 9, will cause the pressure in shell 25 to rise. This rising pressure on the surface of liquids 35 forces the liquids up through the probe and into conduit 28 and out conduit 11. In this manner, we have the volume of shell 25, the function of conduits 9 and 11, and the operation of valve 17 by float 36 functioning in a manner to separate the gas and liquid phases, contact the probe by the liquid and recombine the gaseous and liquid phases.

*Probe placement*

Separator shell 25, and its internal structure, has been discussed as to its function in separating the well stream into liquid and gaseous phases. Liquid conduit 28 has been oriented, mounted through top closure plate 27 of shell 25. In FIG. 2, conduit 28 is disclosed as extending down into shell 25 to a point below the surface of liquid body 35. The lower end of conduit 28 has a closure plate with an opening therethrough formed by turned-up lips extending back up into conduit 28.

The top of conduit 28 is flanged and fixed thereto is a closure plate 37 through which is centrally mounted the probe assembly 29. Probe assembly 29 is suspended from closure plate 37, down through conduit 28, to telescope through the lower closure plate 39 of conduit 28. This arrangement extends the active portion of the probe assembly 29 well below the surface of liquid body 35.

This arrangement of probe assembly 29 on closure plate 37 provides for complete removal of the probe assembly 29 from the separator for inspection, repair or replacement. Further, the provision of top plate 27, as removable from the top of shell 25, gives access to the internal separator structure of shell 25 for repair, inspection and replacement. Mounted as disclosed in FIG. 2, the probe assembly 29 provides a removal system for liquids from body 35 through the lower end of assembly 29, out holes 40, up conduit 28, and out conduit 11. With this arrangement, the active section of the probe is provided intimate and consistent association with the degassed liquids of body 35, together with isolation from the ambient temperature conditions external shell 25.

PROBE STRUCTURE

Probe assembly 29, mounted on closure plate 37, has the basic function of suspending the capacitance structure, composed of electrode 41 and shield 42, below the surface of liquids 35 in shell 25. At such location, the capacitance structure is both isolated from ambient temperature variations and is positioned to intimately, and consistently, contact the liquids withdrawn from body 35.

The probe assembly 29 has a base in pipe extension 43. Pipe extension 43 is in the form of a hollow conduit, welded through closure plate 37 with an electric terminal housing 44 mounted on its upper end and tubular shield 42 mounted on its lower end. More specifically, the lower end of pipe extension 43 is threaded to receive a cap 45 of conductive metal. The lower end of cap 45 is threaded to receive shield 42.

Electrode 41 is electrically insulated from cap 45, shield 42 and pipe extension 43 by an insulating sheath 46 which extends the full length of electrode 41 and beyond. An insulator 47 is clamped within cap 45 and about the top of electrode 41 while a plug 48 of insulating material is inserted up the lower end of insulator 46 to abut the lower end of electrode 41. A compression ring 49 holds plug 48 and insulator 46 together and the lower end of the assembly is fixed to the center of a screen 50 covering the end of shield 42.

The foregoing relation of parts provides a flow path of fixed dimension for the liquids of body 35 up through screen 50, the annulus formed between insulator 46 and shield 42 and out holes 40. With lower end closure 39 of conduit 28 sealed to the outside of shield 42 below holes 40, the liquids of body 35 are provided a path continuing on up conduit 28 to exit through conduit 11. Therefore, the capacitance element comprising electrode 41 and shield 42 has all the liquids of body 35 flowing out of the separator going through the probe in a consistent physical relation to the probe.

An electrical cable 51 attaches to the end of electrode 41 and extends up through pipe extension 43 to an electric terminal housing 44. Bushing 52 receives cable 51 centrally therethrough and electrical contact is completed with the electrode 41 to the electric circuit within housing 7. With the meter mechanism within housing 7 calibrated to interpret the capacitance values of the probe in terms of the percentage of oil in the liquids of body 35, a signal representative of this net oil can be applied to couple a register 53 (see FIG. 1) to the rotating shaft of positive displacement meter 11A for periods of time proportional to the relative amount of oil in the liquids passing through meter 11A. The result will be a register 53 reading in terms of the net oil passing through meter 11A, separator 5, and into manifold conduit 19.

FIG. 4 is provided to show the screen 50 in more detail. All sorts of foreign bodies find their way from the well head 1 to separator 5. The larger foreign bodies may become lodged in the relatively small space between electrode 41 and sheath 42. Obstruction by these bodies may be obviated by screen 50 mounted across the end of sheath 42.

Screen 50 can be strong enough to act as both a stable support for the lower end of electrode 41 as well as a filter. The specific form is disclosed as representative of many variations possible for this structure.

OPERATION

The flow pattern of gas and liquids through the separator housing, and connecting conduits, should be evident from the foregoing description. The well stream comes into the shell 25 through conduit 3 and separates into its gas and liquid phases. The degassed liquids collect in body 35 and flow through shield 42 and around electrode 41 to holes 40. The liquids then pass up conduit 28 and pass out through conduit 11. The gas passes out through conduit 9 and recombines with the liquids.

Control of the liquid flow is extended by float 36. Float 36 sets up a control pressure for valve 17 which places a pressure on the liquids within separator 5 to force the liquids out conduit 11 and into recombination.

The probe 5, as a capacitance between shield 42 and electrode 41, is included in the circuit disclosed in United States patent, Gunst et al. 2,720,624. This circuit is an oscillating crystal-controlled vacuum-tube circuit with the probe-capacitance connected as a primary element in the resonant portion of the circuit. The current of the plate circuit of the vacuum-tube will indicate the dielectric constant of the mixture to which the probe is exposed.

Variable capacitance structure can be placed in this circuit, parallel to the probe. Adjustment of these structures can be made to compensate for the change in dielectric constant manifested by the circuit as caused by temperature change of the mixture being measured. A temperature responsive device is proposed to make this compensating adjustment as the temperature of the incoming well stream varies.

Specifically, a temperature responsive element 54 is placed in conduit 3, just prior to connection of the conduit 3 with separator 5. Conventional mechanism made responsive to this element 54 to position the compensating capacitance in the probe circuit is meter station 7. Therefore, the changes in well stream temperature are compensated and the swings in ambient temperature are isolated from the probe.

Properly responsive to the dielectric constant of the mixture of oil and water, the electric circuit has its signal transduced into a series of pulses proportional to the amount of oil in the mixture. The structure for accomplishing this result is disclosed in at least the United States patent application S.N. 329,605, filed by Karl T. Ball, December 4, 1963, as a continuation-in-part of S.N. 106,903, filed by Karl T. Ball, May 1, 1961, now abandoned. The transduced pulses are then applied to couple register 53 to the meter 11A that the final reading of register 53 will be in terms of quantative net oil passed through meter 11A.

The accuracy of the measurement is increased by the environment provided for the probe by the present invention. The environment provides stabilized well liquids, isolation from ambient temperature variations, dimensional consistency between the probe and liquids, compensation for temperature variations of the well stream coming to the probe, a filter for solid objects which would obstruct flow of the liquids through the probe and a dynamic flow of temperature-stable well liquids which obviates the position of paraffin and other solids from the liquids on to the probe structure. The art of associating a capacitor structure with well liquids to determine the amount of oil in the liquids is materially advanced by each one of the various features of the invention and their several combinations.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

A system for measuring the oil in the production of an oil well including,
   a vessel into which the production of an oil well is produced,
   structure within the vessel for separating the gaseous phase of the production from the liquid phases,
   means for collecting the degassed liquid phases in a body within the vessel,
   a first conduit mounted through a wall of the vessel and extending from its entrance positioned below the surface of the body of degassed liquid within the vessel to an exit at a delivery external the vessel,
   a second conduit mounted through a wall of the vessel and extending from its entrance positioned within the body of gaseous phase within the vessel to an exit at a delivery external the vessel,
   a level control structure mounted within the vessel and connected to control the level of the body of liquids within the vessel above a predetermined minimum,
   an electrical capacitance probe assembly mounted on the entrance of the first conduit to measure the percentage of water in the liquids and extending below the surface of the body of degassed liquids with an arrangement whereby the active section of the probe is in intimate and consistent association with the degassed liquids as the liquid flow from their body into the first conduit,
   a liquid meter mounted in the first conduit downstream of the probe assembly to measure the total volume of liquid passed through the first conduit,
   and an electric circuit connected to the probe assembly and liquid meter so as to combine their measurements and provide a measure of the oil in the total liquid volume.

References Cited by the Examiner

UNITED STATES PATENTS 2,672,880   3/1954   Hermanson   324—61
3,003,106   10/1961   Vesper et al.   324—61

WALTER L. CARLSON, *Primary Examiner.*

W. H. BUCKLER, E. E. KUBASIEWICZ,
*Assistant Examiners.*